United States Patent
Campbell

[11] Patent Number: 6,129,054
[45] Date of Patent: Oct. 10, 2000

[54] ANIMAL COLLAR

[76] Inventor: Blair H. Campbell, R.R. #3, Box 7029, Rutland, Vt. 05701

[21] Appl. No.: 09/174,827

[22] Filed: Oct. 19, 1998

[51] Int. Cl.[7] .................................................... A01K 27/00
[52] U.S. Cl. ............................................................. 119/856
[58] Field of Search ................................... 119/856, 713, 119/714, 792, 793, 850, 853, 855; 128/845, 846, 867, 876, 878, 880, 882, 112.1, 115.1, 117.1; 602/60, 61, 63; 604/386, 389

[56] References Cited

U.S. PATENT DOCUMENTS

| | | | |
|---|---|---|---|
| 2,446,902 | 8/1948 | Brand . | |
| 3,209,517 | 10/1965 | Hyman | 119/850 |
| 4,081,150 | 3/1978 | Tyson | 128/402 |
| 4,091,766 | 5/1978 | Colliard | 119/106 |
| 4,204,534 | 5/1980 | Leary | 128/134 |
| 4,614,183 | 9/1986 | McCracken et al. | 128/132 R |
| 4,719,876 | 1/1988 | Wilken | 119/106 |
| 5,048,542 | 9/1991 | Murray | 128/889 |
| 5,307,764 | 5/1994 | Moy | 119/815 |
| 5,349,927 | 9/1994 | Campbell | 119/815 |
| 5,469,814 | 11/1995 | Moy et al. | 119/815 |
| 5,628,283 | 5/1997 | Huegelmeyer | 119/815 |
| 5,676,094 | 10/1997 | Gun-Munro | 119/850 |
| 5,697,328 | 12/1997 | Hunter | 119/714 |
| 5,778,828 | 7/1998 | Klinkhart et al. | 119/815 |
| 5,915,337 | 6/1999 | Klinkhart et al. | 119/815 |

FOREIGN PATENT DOCUMENTS

| | | | |
|---|---|---|---|
| 1191748 | 8/1985 | Canada | 119/74.1 |

*Primary Examiner*—Thomas Price
*Attorney, Agent, or Firm*—Michael J. Weins; Jeffrey E. Semprebon

[57] ABSTRACT

A pad is designed to form a collar for supporting the neck of an animal. The pad is formed from a resilient, trimmable, and washable material having a top surface and a bottom surface separated by a pad thickness t. The pad is preferably substantially rectangular, having a pair of free ends which embrace the mandible and scapula of the animal, and a pair of engaging ends which overlap. The pad has a pad length $L_p$ between the engaging ends, and a pad width $W_p$ between the free ends. Preferably, the ratio of $L_p/W_p$ is such that $3<L_p/W_p<6$. The pad is preferably fabricated from a closed-cell polymer foam, and the top and bottom surfaces preferably form soil-resistant layers. Cross-linked polyethylene foam having a density of between about 2 and 6 lbs/cu.ft. with the thickness t being about ¼ inch has been found effective. To form a collar, one or more inelastic bands secure the pad about the neck. Each band is preferably a length of surgical adhesive tape, and is preferably of sufficient length to overlap itself when wrapped around the pad.

20 Claims, 3 Drawing Sheets

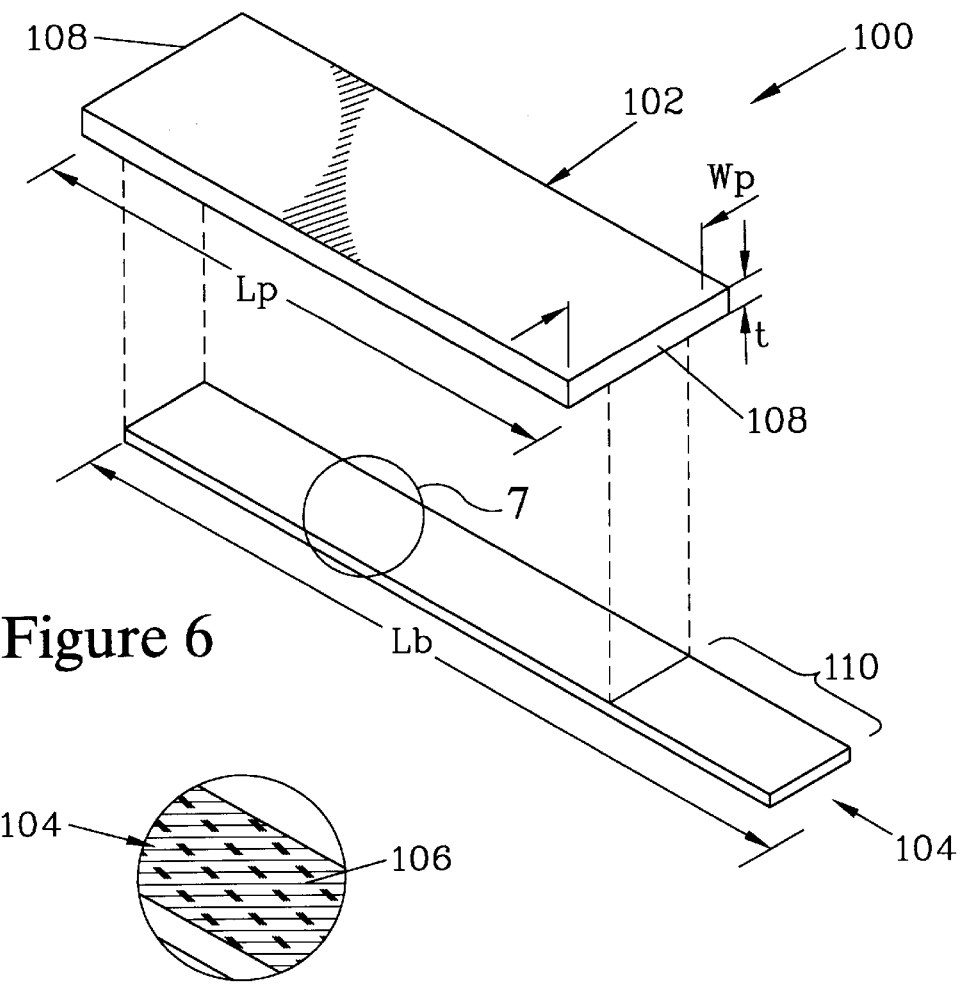
Figure 6
Figure 7
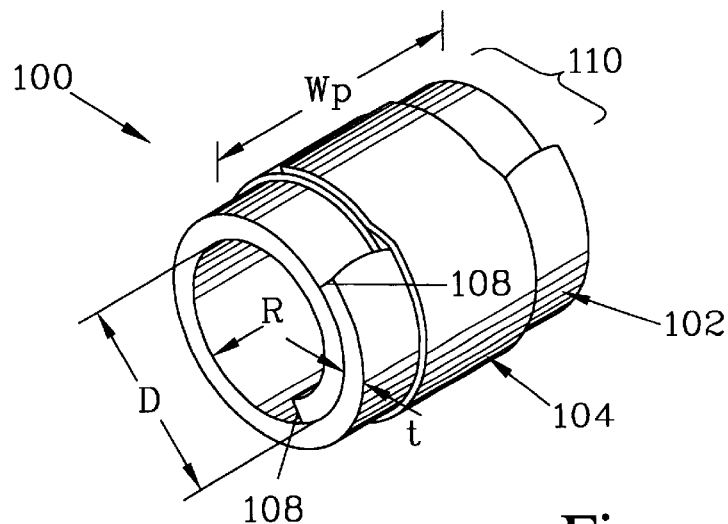
Figure 8

ANIMAL COLLAR

FIELD OF THE INVENTION

The present invention relates to a restraining collar for household animals such as cats and dogs which limits bending of the neck of the animal and offers support and protection for the neck of the animal.

BACKGROUND OF THE INVENTION

There have been a variety of protective collars which are cone-shaped that serve to limit the ability of an animal to lick parts of its body, to bite at stitches, or to tear off bandages. These collars are generally either difficult to fit onto and remove from the animal, or can be readily removed by the animal. This problem has been overcome by the present inventor with the collar described in U.S. Pat. No. 5,349,927. While collar of the '927 patent overcomes the problems of fitting and removing the collar, the cone-shaped collar extends away from the animal, somewhat impairing the mobility of the collared animal, and does not offer support for the neck.

The problem of impaired mobility of the animal associated with cone-shaped collars has been addressed by a variety of tubular collars which restrict the motion of the head of the collared animal, while not impairing mobility. U.S. Pat. Nos. 5,307,764 and 5,469,814 teach collars which restrict the motion of the head of an animal by wrapping the neck in a tubular collar which is made of a hard flexible material. The collar is configured such that the edges of the collar press on the neck as the animal attempts to move its head.

A head-engaging neck collar is disclosed in U.S. Pat. No. 5,628,283 which overcomes some of the comfort problems of earlier collars. This collar has a tubular shell of a plastic material and is configured with a curved edge to engage the head such that the animal cannot turn its head toward the body. To assure comfort, the tubular shell is preferably provided with an inside padding of expanded plastic. In the event that padding is not employed, then the edges of the collar can be provided with a bevel to increase comfort. While such a collar may be more comfortable to the animal, it limits not only the mobility of the head but also the jaw of the animal, making eating and drinking more difficult with the collar in place.

Additional restraining collars which have designs which should not interfere with the comfort of the animal wearing the collar are taught in Canadian Patent 1,191,748 and U.S. Pat. No. 4,719,876. These collars provide a pad which is encased to form a neck restraint when applied to the neck of an animal. These collars employ hook-and-pile type fasteners attached to the end regions of the collars. Hook-and-pile type fasteners have been found problematic, since they tend to quickly become clogged with fur or other obstructions when worn by animals, and cease to be effective.

While the collars of the '748 and '876 patents can be effective in limiting the motion of the head of an animal, the pads are difficult to fabricate and, in many cases, may be removed by the animal insistently scratching at the collar.

Furthermore, for all of the collars discussed above, a variety of widths must be manufactured to provide the appropriate size for a particular animal, and these collars are not well suited to individual tailoring to meet the needs of a particular animal. The lack of the ability to readily modify a collar increases tooling costs and increases the inventory which must be maintained by an animal care provider. Also, as the level of comfort to the animal increases, the difficulty in cleaning the collar increases.

U.S. Pat. No. 5,697,328 does address the problem of providing a sizable collar and teaches that a polymer sheet collar can be trimmed to some extent to vary the length and diameter of the collar. However, it teaches that such trimming results in barbed edges and that care should be used to avoid contact of the barbed edges with the animal. Furthermore, there is no teaching that such a collar could be trimmed to avoid contact with sensitized regions of the neck.

Thus, there is a need for a simple, tubular-type collar which is comfortable, securable, trimmable, and effective in restraining the motion of the head of an animal, providing support and protection for the neck of the animal, and reducing the ability of the animal to lick or bite infected or injured regions of its body.

OBJECTS OF THE INVENTION

It is an object of the invention to provide a comfortable tubular collar for restraining the motion of the head of an animal.

It is also an object of the invention to provide a comfortable collar which provides support for the neck of the animal.

It is another object of the invention to provide a continuously adjustable restraining collar.

It is another object of the invention to provide a trimmable restraining collar to allow the collar to be fitted to a large range of animal neck sizes.

It is yet another object of the invention to provide trimmable restraining collar which can be trimmed to avoid contact with injured regions of the neck.

A further object of the invention is to provide a restraint collar which can be trimmed to accommodate a variety of shapes of animal necks.

Still another object of the invention is to provide a padded collar which is readily securable such that it may be easily applied and the animal cannot readily remove the collar.

A further object of the invention is to provide a reusable collar which may be readily cleaned.

SUMMARY OF THE INVENTION

The present invention in its simplest form is a pad which is designed to be configured into a collar for supporting the neck of an animal and limiting the mobility of the head of the animal. The pad of the present invention is formed from a strip of a resilient, trimmable, and washable material. The pad has a top surface and a bottom surface which are spaced apart by a pad thickness t.

It is preferred that the pad be substantially rectangular in shape. When the pad is substantially rectangular in shape, it is bounded by a pair of free ends and a pair of engaging ends. When the pad is wrapped around the neck of the animal, the free ends respectively embrace the mandible and scapula of the animal, while the pair of engaging ends overlap each other. The pad has a pad length $L_p$ which is the distance between the engaging ends, and a pad width $W_p$ which is the distance between the free ends.

It is preferred that the ratio of $L_p/W_p$ be maintained such that $$3 < L_p/W_p < 6.$$

Maintaining this range for the ratio of $L_p/W_p$ typically assures that, when the pad is selected having a pad width $W_p$ which spans the distance between the scapula and mandible of a given animal, the pad length $L_p$ is sufficient for closure of the pad when wrapped around the neck of the animal to form a collar.

It is preferred that the pad be fabricated from a polymer foam, and more preferably from a closed-cell polymer foam. Closed-cell foams generally offer greater stiffness for equivalent density, as well as providing a pad which is non-absorbent of liquids, thereby reducing soiling and facilitating cleaning by washing. It has been found that it is preferred to employ a foam with density of between about 2 and 6 lbs/cu.ft. Stiffeners can be incorporated into the foam material to increase the stiffness of the pad at the lower end of the density spectrum.

To increase the ease with which the pad can be maintained in a state of cleanliness, it is preferred that, in addition to employing a closed-cell foam material, the top and bottom surfaces of the pad form soil-resistant layers. Closed-cell polymeric foam sheets with such surfaces are commercially available, the soil-resistant surfaces being created as the foam is extruded in sheet form in an oxidizing or chemically treated environment.

It is also preferred to use a closed-cell foam for the pad to enhance the trimmability of the pad. The closed-cell foam gives the pad increased internal connectivity and lessens the likelihood of tearing as the pad is trimmed.

The pad is designed to be configured into a tubular restraining collar which surrounds the neck of an animal and spans the distance between the animal's scapula and mandible when placed around the animal's neck. When the pad is so configured, the engaging ends of the pad are overlapped while the free ends of the tubular collar are positioned to engage the scapula region and the mandible region of the animal.

The resulting collar includes at least one inelastic band having an adhesive coating designed to adhesively engage the upper surface of the pad and secure the pad about the neck of the animal. The at least one inelastic band allows the pad to be adjusted in a continuous manner so as to comfortably fit the neck of the animal to which the collar is applied. Preferably, the at least one inelastic band is a length of adhesive tape, and more preferably surgical adhesive tape. It is further preferred that the tape have sufficient length to overlap itself when wrapped around the pad to further secure the collar. The adhesive layer on the tape also adheres to the pad to prevent motion between the pad and the at least one inelastic adjustable band.

When the top surface of the pad is formed as a soil-resistant layer such as discussed above, it has been found that such a surface is readily adhesively engaged by a surgical adhesive tape while allowing the tape to be peeled from such a surface without damage, to permit re-use of the pad.

Preferred foams for fabrication of the pad are foamed polymers which are cross-linked. One such polymer which is preferred is a cross-linked polyethylene. For pads formed from cross-linked polyethylene foams in the preferred density range set forth above, it has been found that a pad thickness t of between about 3/16 inch and 5/16 inch typically provides adequate stiffness when bent into a tube to form a collar to restrain the head of the animal, while maintaining the free ends of the collar sufficiently compliant so as to avoid pain in the scapula region and mandible region of the animal, which the free ends engage.

It is further preferred that the substantially rectangular pad be provided with rounded corners having a minimum radius of at least about ½ inch. When rounded corners are employed, it is further preferred that both a first continuously adjustable band and a second continuously adjustable band be employed to maintain the pad in a tubular collar configuration. In such cases, it is further preferred that the bands engage the exposed rounded corners, thereby further inhibiting relative motion between the engaging ends of the substantially rectangular pad and minimizing any axial slip of the pair of engaging edges relative to each other.

BRIEF DESCRIPTION OF THE FIGURES

FIG. 6 is an exploded isometric view illustrating a collar of the present invention which employs a pad similar to that illustrated in FIGS. 1 and 2. In this embodiment, surgical adhesive tape is attached along the full length of the pad. A tape extension is provided which, when the pad is configured into a collar, is employed to secure the pad around an animal's neck. The pad and the band are shown in an open position before the pad has been wrapped around the neck of the animal. The tape has a band length $L_p$ which is greater than the pad length $L_p$.

FIG. 7 is a detail of the region 7 of FIG. 6.

FIG. 8 is an isometric view illustrating the collar shown in FIG. 6 where the substantially rectangular pad has been bent to form a tube of diameter D which accommodates the neck of an animal not shown. The pad width $W_p$ is sufficient to provide a tubular collar which extends substantially from the scapula to the mandible of the animal. The pad thickness t of the pad is selected such that, in combination with the curvature R of the pad, the pad provides a collar with sufficient rigidity that it provides support to the animal's neck and limits bending of the neck. The tape adheres to the pad and, as configured, is of sufficient length to be wrapped onto itself. An extension of the tape overlaps a portion of the remaining tape and adhesively bonds thereto to secure the collar. Adhesive forces between the pad and the band serve to prevent relative motion between the pad and the band.

BEST MODE OF CARRYING THE INVENTION INTO PRACTICE

Figure 1:
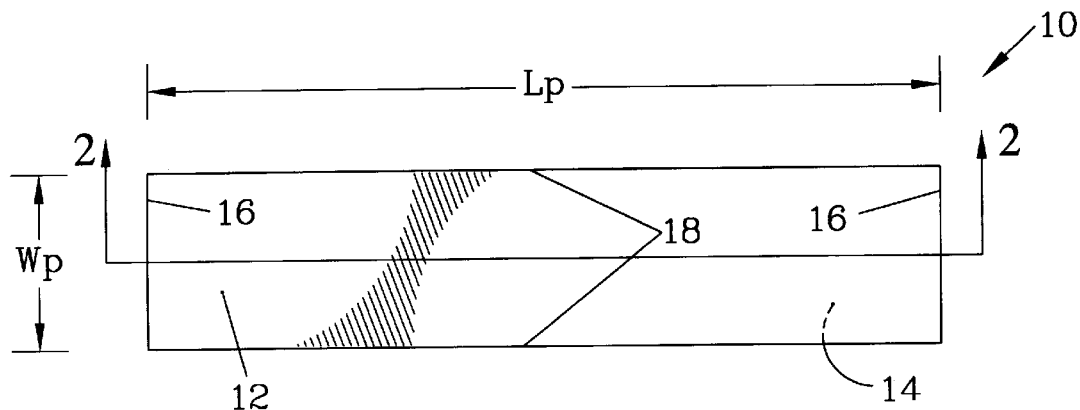
FIG. 1 is a schematic representation of one embodiment of a pad of the present invention. The pad is formed by a strip of foam material having a pad length $L_p$ and a pad width $W_p$. The pad is fabricated from a foam having a thickness t.
Figure 2:
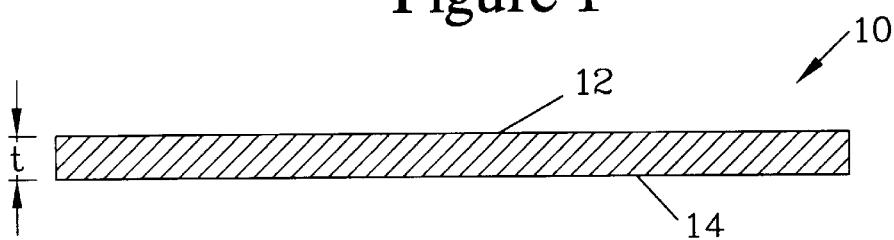
FIG. 2 is a view of the section 2—2 of FIG. 1.

FIGS. 1 and 2 illustrate a neck pad 10 of one embodiment of the present invention. The neck pad 10 is formed from a strip of a foam, preferably a polymeric foam. The pad 10 has a top surface 12 and a bottom surface 14 (best illustrated in FIG. 2), which are spaced apart by a pad thickness t (shown in FIG. 2). The pad 10 is substantially rectangular, and has a pad length $L_p$ which spans the distance between a pair of engaging edges 16, and a pad width $W_p$ which spans the distance between a pair of free edges 18. It is preferred that the ratio of $L_p/W_p$ is maintained such that $3<L_p/W_p<6$. This range for the ratio of $L_p/W_p$ is preferred to generally assure that, when the pad 10 is chosen to form a collar for a given animal (not shown), and the pad width $W_p$ is selected such that the pair of free edges 18 substantially span the distance between the scapula and mandible of the animal, the pad length $L_p$ is sufficient to allow closure of the pad 10 around the neck of the animal, with the pair of engaging edges 16 overlapping.

Figure 3:
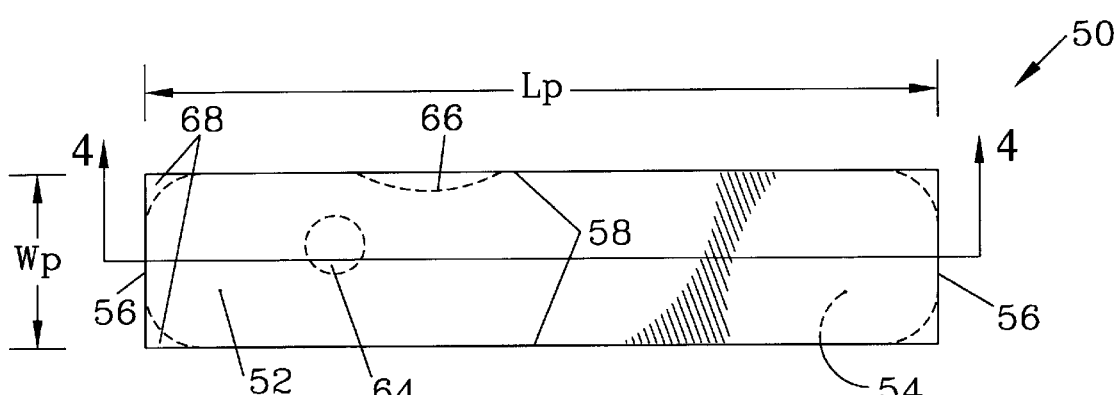
FIG. 3 is a schematic representation of another embodiment of a pad of the present invention. In this embodiment, the foam is a closed-cell foam. The pad of this embodiment is bounded by a top side and a bottom side which have been treated to form soil-resistant layers on both the top side and the bottom side of the pad. The substantially rectangular pad may be trimmed to provide a contour which follows the profile of the scapula and/or the mandible of the animal to which the pad is to be applied. Cut-outs may also be provided to avoid contact with injured, inflamed, or infected regions of the neck of the animal.
Figure 4:
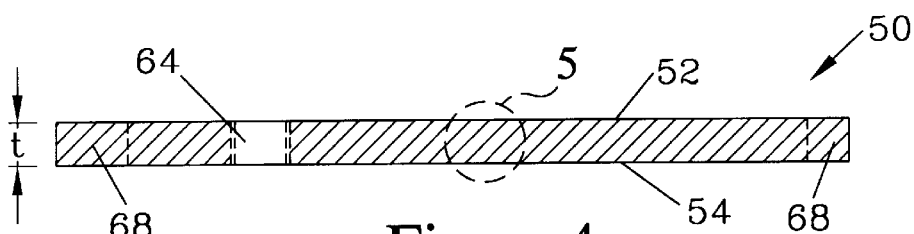
FIG. 4 is a view of the section 4—4 of FIG. 3.
Figure 5:
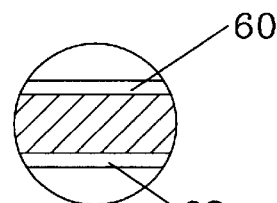
FIG. 5 is a detail of the region 5 of FIG. 4.

FIGS. 3–5 illustrate another embodiment of the present invention, a neck pad 50. Again the pad 50 is formed from a foam which, in this embodiment, is a cross-linked polymeric foam with a closed-cell structure. Closed-cell foams are preferred since they provide a non-absorbent material which does not pick up fluids from the animal or from the environment, and thus requires less cleaning and can be more readily cleaned by washing. The connectivity of closed-cell foams generally provides greater rigidity for a given foam density and aids in the trimmability of the pad 50.

The pad 50 again has a top surface 52 and a bottom surface 54 (best illustrated in FIG. 4) which are spaced apart by a pad thickness t (shown in FIG. 4). The pad 50 is again preferably substantially rectangular in shape, having a pad length $L_p$ which spans the distance between a pair of engaging edges 56 and a pad width $W_p$ which spans the distance between a pair of free edges 58. It is again preferred that the ratio of $L_p/W_p$ is maintained such that $3<L_p/W_p<6$ so as to generally assure that, when the pad is chosen to assure that the pair of free edges 58 span the distance between an animal's scapula and mandible, there will be closure of the pad 50 and the pair of engaging edges 56 will overlap when the pad 50 is placed around the neck of the animal.

As illustrated in FIG. 5, which is a detail of the region 5 of FIG. 4, it is further preferred that the top surface 52 be provided with an upper soil-resistant layer 60, and that the bottom surface 54 be provided with a lower soil-resistant layer 62. Such soil-resistant layers (60 and 62) are readily formed when the foam material is extruded in sheet form in an oxidizing environment or otherwise chemically active environment which promotes a surface reaction which toughens and smooths the surfaces (52 and 54) as the foam material is extruded. Typically, these surfaces (52 and 54) inherently result from the fabrication process unless the foam is formed in bulk and then sectioned to form sheets.

The pad 50 as described, when fabricated from a reinforced cross-linked closed-cell foam having a density between about 2 and 6 lbs./cu.ft., has sufficient stiffness to serve as a collar if the pad 50 has a nominal pad thickness t of about ¼ inch. When the pad 50 is formed with the above described characteristics, it has been found that the pad 50 can be readily trimmed. The broken lines illustrate patterns which might be employed. An open region 64 could be included to prevent contact of the pad 50 with a region of the neck which may have been injured or infected. Similarly, the pair of free edges 58 can be trimmed to form contoured edges such as the contoured edge 66 to compensate for any irregularities in the scapula and mandible of the animal. The ability to be able to readily trim the pad allows the pad 50 to form a collar for a wide variety of animal neck shapes. Other contouring of the pad 50 which enhances the performance of the pad 50 may be readily provided, such as providing rounded corners 68.

FIGS. 6–8 illustrate a collar 100 which employs a pad 102 which is similar to the pad 10 illustrated in FIGS. 1 and 2 and described above. The collar 100 is shown in FIG. 6 in an exploded isometric view, before the pad 102 has been conformed to the neck of the animal onto which it will be placed. The collar 100 has a single inelastic band 104 formed from a piece of surgical adhesive tape. As is illustrated in FIG. 7, which is a detail of the region 7 of FIG. 6, an adhesive 106 resides on the side of the band 104 which is brought into contact with the pad 102. It has been found that surgical adhesive tape is well suited for attaching to the pad 102 when the pad 102 is formed of a polymer foam material.

The pad 102 has a pad length $L_p$ between a pair of engaging edges 108, and the band 104 of this embodiment has a band length $L_b$ such that $L_p<L_b$. This allows the band 104 to be attached to the pad 102 in a manner such that the band 104 runs substantially over the pad length $L_p$ of the pad 102 while forming an extension 110 of the band 104 which extends beyond only one of the pair of engaging edges 108. This facilitates one scheme for placement of the collar 100 around the neck of the animal, which is discussed in greater detail below.

FIG. 8 illustrates the collar 100 when the pad 102 has been wrapped into a tubular shape having a diameter D so as to conform the neck of the animal to which it is fitted. To form the collar 100 from the pad 102, the band 104 is positioned and adhered to the pad 102. The band 104 is positioned with respect to the pad 102 so as to create the extension 110 which extends over only one of the pair of engaging edges 108. The pair of engaging edges 108 are then overlapped and the extension 110 wrapped around the collar 100. The extension 110 at least partially overlaps the remainder of the band 104 to adhere it to itself.

Since the band 104 is formed of surgical adhesive tape, the extension 110 of the band 104 may be readily wrapped and adhered to itself with one hand, while the user maintains the pad 102 firmly in place about the neck of the animal with the other hand. This allows the collar 100 to be quickly and securely applied to the animal.

Figure 9:
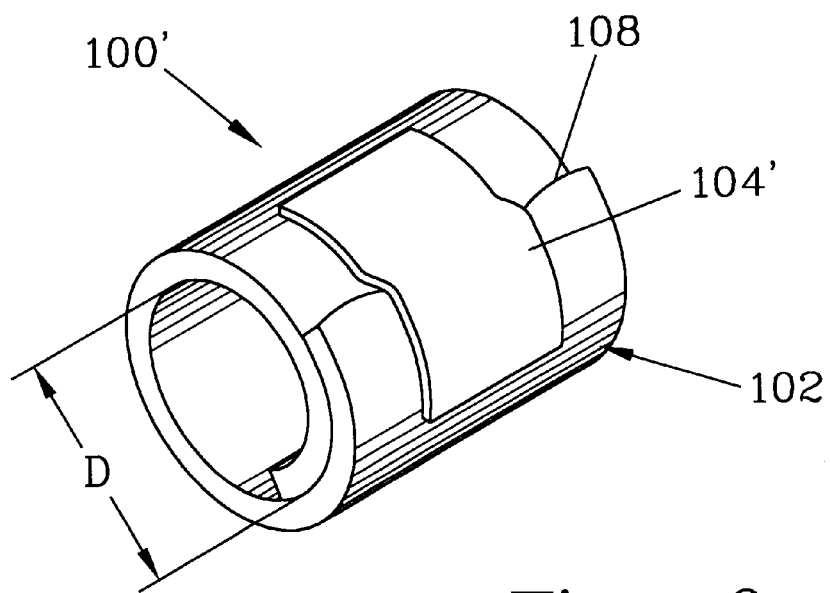
FIG. 9 is an isometric view of an embodiment which is similar to the embodiment shown in FIG. 8. However, in this embodiment, a short piece of surgical adhesive tape is used to secure the pad around the neck of an animal. The surgical adhesive tape is applied after the pad is positioned on the neck.

FIG. 9 illustrates the collar 100' where another method for applying the pad 102 to the neck of an animal is employed. With this technique, the pad 102 is first wrapped into a tubular shape of diameter D about the neck of the animal. A piece of tape 104' is adhered to the pad 102 so as to cross the one of the pair of engaged edges 108 which is exposed to secure the pad 102 about the neck of the animal. In this case, the tape 104' can be significantly shorter that the pad length $L_p$ (shown in FIG. 6).

Figure 10:
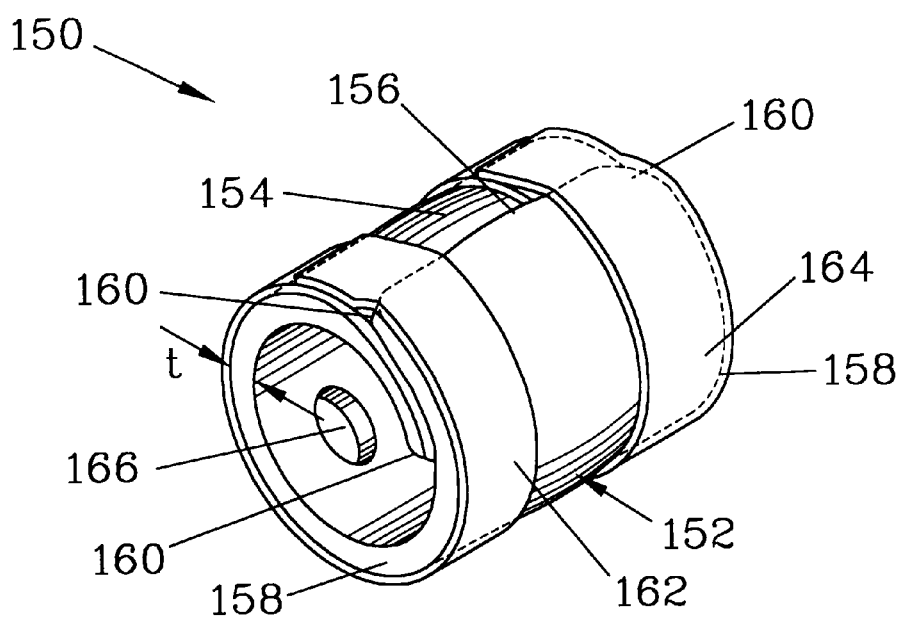
FIG. 10 is an isometric view illustrating another embodiment of the present invention, a collar which employs a substantially rectangular pad similar to that shown in FIGS. 3 and 4. In this embodiment, two strips of surgical adhesive tape are employed to form bands maintaining the pad in position when the pad is configured to fit the neck of the animal. A first tape strip is attached to the pad in the vicinity of a scapula-engaging edge of the pad, while a second tape strip is attached to the pad in the vicinity of a mandible-engaging edge of the pad. The adhesive of the tape adheres to the pad and to itself when overlapped. The adhesive on the tape also serves to prevent relative motion between the bands and the substantially rectangular pad.

FIG. 10 is an isometric view illustrating a collar 150 which forms another embodiment of the present invention. The collar 150 employs a pad 152 which is similar to the pad 50 discussed above, and is formed of a closed-cell cross-linked polymer foam material which is provided with soil-resistant surfaces 154. The pad 152 is substantially rectangular, having a pair of engaging edges 156 (only one of which can be seen) and a pair of free edges 158. The pad 152 illustrated has rounded corners 160.

The collar 150 employs both a first band 162 and a second band 164, which are affixed to the pad 152 in close proximity to the pair of free edges 158. The first band 162 and the second band 164 are preferably positioned so as to traverse the rounded corners 160 of the pad 152, further limiting axial slip between the pair of engaging edges 156.

It has been found that providing the soil-resistant surfaces 154 provides an additional unexpected benefit in that, while they assure adherence of the first band 162 and the second band 164 to the pad 152, the bands (162 and 164) may be peeled off without degrading the soil-resistant surfaces 154. This greatly facilitates re-use of the pad 152.

In this embodiment, the cross-linked closed-cell foam material from which the pad 152 is fabricated has a nominal pad thickness t of ¼ in. This material can be readily trimmed to suit a particular application. In the example illustrated, the pad 152 has been trimmed to provide an open region 166. The open region 166 allows the collar 150 to provide support to avoid bending of the neck, but while avoiding direct contact with the area of the neck which underlies the open region 166. The pad 152 may thus be readily trimmed to allow the collar 150 to be employed on an animal having wounds or other aggravated areas on its neck.

While the novel features of the present invention have been described in terms of particular embodiments and preferred applications, it should be appreciated by one skilled in the art that substitution of materials and modification of details obviously can be made without departing from the spirit of the invention.

What I claim is:

1. An animal collar for supporting and substantially immobilizing the neck of an animal, the collar comprising:
    a substantially rectangular pad of a resilient, trimmable, washable material having a pad length $L_p$ of sufficient size to assure closure about the animal's neck and a pad width $W_p$ of sufficient size to extend substantially between the animal's scapula and mandible, wherein $L_p > W_p$;
    at least one inelastic band of sufficient length to encircle said pad to maintain said pad in closure about the neck of the animal; and
    means for preventing relative motion between said pad and said at least one band.

2. The collar of claim 1 wherein said pad has an inner soil-resistant surface which is placed against the neck of the animal and an outer soil-resistant surface.

3. The collar of claim 2 wherein said pad is formed of a closed-cell cross linked polymer foam material.

4. The collar of claim 3 wherein said foam material has a density between about 2 and 6 lbs./cu.ft. and has a thickness t of between about 3/16 inch and 5/16 inch.

5. The collar of claim 1 wherein said at least one band is formed from at least one length of adhesive tape applied to said pad.

6. The collar of claim 5 wherein said at least one length of adhesive tape has a band length $L_b$ which is greater than said pad length $L_p$.

7. The collar of claim 5 wherein said at least one length of adhesive tape consists of at least two bands of adhesive tape positioned in a spaced-apart relationship to each other.

8. The collar of claim 7 wherein said substantially rectangular pad has rounded corners, said at least two bands of adhesive tape traversing said rounded corners to provide lateral support.

9. The collar of claim 1 wherein said at least one band is formed from at least one length of surgical adhesive tape applied to said pad.

10. The collar of claim 9 wherein said at least one length of surgical adhesive tape has a band length $L_b$ which is greater than said pad length $L_p$.

11. The collar of claim 9 wherein said at least one length of surgical adhesive tape consists of at least two bands of surgical adhesive tape positioned in a spaced-apart relationship to each other.

12. The collar of claim 11 wherein said substantially rectangular pad has rounded corners, said at least two bands of surgical adhesive tape traversing said rounded corners to provide lateral support.

13. An animal collar for supporting and substantially immobilizing the neck of an animal, the collar comprising:
    a substantially rectangular pad of resilient, trimmable, and washable material having a pad length $L_p$ and a pad width $W_p$, wherein the ratio of $L_p/W_p$ is maintained such that:

$$3 < L_p/W_p < 6;$$

at least one inelastic band of length $L_b$ which is greater than $L_p$ for encircling said pad to maintain said pad in closure about the neck of the animal; and
    means for preventing relative motion between said pad and said at least one band.

14. A neck pad for use in combination with at least one inelastic band of length $L_b$ to form a collar when placed around the neck of an animal and secured therearound with the at least one inelastic band, the resulting collar supporting and protecting the neck of the animal and reducing the mobility of the head of the animal,
    the pad being formed of a resilient, trimmable, washable material having a top surface and a bottom surface separated by a pad thickness t, the pad having a pad length $L_p$ and a pad width $W_p$,
    wherein the ratio of $L_p/W_p$ is maintained such that:

$$3 < L_p/W_p < 6,$$

and further wherein $L_p < L_b$.

15. The pad of claim 14 wherein the pad is fabricated from a polymer foam having a density of between about 2 and 6 lbs/cu.ft.

16. The pad of claim 15 wherein the pad is fabricated from a closed-cell polymer foam.

17. The pad of claim 16 wherein said closed-cell polymer foam is a cross-linked polymer and said top surface and said bottom surface are treated to form soil-resistant layers.

18. The pad of claim 17 wherein the pad has rounded corners.

19. The pad of claim 18 wherein said rounded corners have a radius of at least about ½ inch.

20. The pad of claim 19 wherein said pad thickness t measures between about 3/16 inch and 5/16 inch.

* * * * *